United States Patent [19]

Draper

[11] Patent Number: 4,582,358

[45] Date of Patent: Apr. 15, 1986

[54] DRAINAGE SYSTEM FOR VEHICLE HAVING REMOVABLE ROOF PANELS

[75] Inventor: David L. Draper, Hamburg, Mich.

[73] Assignee: Cars & Concepts, Inc., Brighton, Mich.

[21] Appl. No.: 596,158

[22] Filed: Apr. 2, 1984

[51] Int. Cl.$^4$ .................. B62D 25/07; B60R 13/06; B60J 7/11
[52] U.S. Cl. .................. 296/213; 296/208; 296/218; 49/463
[58] Field of Search ............. 296/213, 215, 216, 218, 296/208, 154; 49/463–465, 482, 498

[56] References Cited

U.S. PATENT DOCUMENTS

| | | | |
|---|---|---|---|
| 3,738,670 | 6/1973 | Jelinek et al. | 49/482 |
| 4,088,366 | 5/1978 | Gallitzendorfer et al. | 296/154 |
| 4,133,576 | 1/1979 | Chrysler | 296/218 |
| 4,255,903 | 3/1981 | Reynolds et al. | 49/498 |
| 4,410,211 | 10/1983 | Kloppe et al. | 296/213 |
| 4,475,766 | 10/1984 | McKee | 296/218 |
| 4,492,405 | 1/1985 | Chikaraishi et al. | 296/213 |

FOREIGN PATENT DOCUMENTS 2096548 10/1982 United Kingdom ............... 296/213

Primary Examiner—Robert B. Reeves
Assistant Examiner—Dennis H. Pedder
Attorney, Agent, or Firm—Brooks & Kushman

[57] ABSTRACT

A vehicle body (10) including a pair of removable roof panels (12) for laterally oriented roof openings (14) is provided with a pair of drainage systems (20) respectively associated with the roof openings. Each drainage system (20) includes a U-shaped seal (30) extending around the associated roof opening and a drainage trough (38) that extends around the seal. A front drainage passage (50) receives drainage water from a front section of the trough and is defined by a front molding (53) mounted on the exterior of an associated front pillar (22) of the vehicle body. A rear drainage passage (54) receives drainage water from a rear section of the drainage trough and extends along the exterior of an associated rear pillar (26) within a rear molding (58). A rear seal portion (88) is mounted on a forward flange (84) of the rear molding.

10 Claims, 8 Drawing Figures

DRAINAGE SYSTEM FOR VEHICLE HAVING REMOVABLE ROOF PANELS

TECHNICAL FIELD

This invention relates to a vehicle body construction including a pair of laterally oriented roof openings that are closed by a pair of removable roof panels and have an associated pair of drainage systems for sealing the roof openings from water and for providing drainage at the front and rear extremities of the openings.

BACKGROUND ART

The prior art discloses vehicles that include a pair of laterally oriented roof openings which are selectively opened and closed by a pair of removable roof panels. The United States patent of Buehrig U.S. Pat. No. 2,556,062 discloses a vehicle having such a removable roof panel construction. In the Buehrig patent, each roof opening also includes a seal that extends around the front, the inboard side, and the rear of the opening to provide sealing when the roof panel is closed. The inboard portions of the seals are located on opposite sides of a central strut that connects the vehicle windshield header with a rear portion of the roof. This strut is located between the roof openings and thereby provides structural rigidity to the vehicle while still permitting a convertible-like opening of the roof with the panels removed.

Prior two passenger vehicles, as manufactured by the General Motors Corporation of Detroit Mich., in the United States of America under the trademark CORVETTE, have also included a pair of laterally oriented roof openings that are selectively opened and closed by a pair of removable roof panels. These CORVETTE vehicles have seals supported on the roof panels to engage the front windshield header, the central strut between the roof openings, and the rear roof portion in order to provide a sealed relationship with the panels secured to the vehicle. With such a seal construction, any discontinuity in the sealed relationship of the seal can result in leakage that permits water entry into the vehicle.

U.S. Pat. No. 4,120,529, which is assigned to the assignee of the present invention, discloses a vehicle having a pair of laterally oriented roof openings that are selectively closed by a pair of removable roof panels and sealed by a pair of drainage seals that are mounted on the vehicle body rather than on the panels. Such a construction provides enhanced sealing since a small discontinuity in the sealed relationship of each seal with the roof panel does not result in leakage. Rather, the roof openings are bounded by channels partially defined by the seals such that water is directed toward the lateral outboard ends of the roof openings where the outboard edges of the closed roof panels are located. Such outboard ends of the channels are located approximately above the front seat occupant's lap and above the rear seat floor in commercial vehicles that have been constructed in accordance wih the teachings of this patent.

DISCLOSURE OF THE INVENTION

An object of the present invention is to provide an improved drainage system for a vehicle having a pair of laterally oriented roof openings that are closed by a pair of removable roof panels.

The vehicle body in which the drainage seal is incorporated includes a front windshield header extending laterally with respect to the vehicle body and also includes a pair of front pillars that respectively support opposite ends of the windshield header. A rear roof portion that is spaced rearwardly from the windshield header extends laterally with respect to the vehicle body. A pair of rear pillars respectively support opposite lateral sides of the rear roof portion and may be embodied by either intermediate side pillars or rear sail-panel type pillars depending upon the particular body style of the vehicle. A central strut extends longitudinally between the windshield header and the rear roof portion to define a pair of roof openings that are oriented in opposite laterally opening directions. The pair of removable roof panels of the vehicle respectively close the pair of roof openings and are removed to provide opening thereof that provides a convertible-like vehicle.

A pair of drainage systems constructed in accordance with the present invention are respectively associated with the pair of roof openings of the vehicle body and each includes a U-shaped seal extending around the associated roof opening. The seal has front, intermediate, and rear sections that cooperatively define the U-shaped configuration around the roof opening. A U-shaped drainage trough extends around the seal and has front, intermediate, and rear sections respectively extending alongside the corresponding sections of the seal. The front and rear sections of the drainage trough have outer ends respectively located adjacent the associated front and rear pillars of the vehicle body. A rigid front molding is mounted on the associated front pillar extending therealong and having a front drainage passage therein extending along the outside of the associated front pillar. The front drainage passage has an upper end connected to the adjacent outer end of the front section of the drainage trough to receive water therefrom for concealed drainage flow down the outside of the front pillar. A rear molding is also provided mounted on the associated rear pillar extending therealong and having a rear drainage passage therein extending along the outside of the rear pillar. The rear drainage passage has an upper end connected to the adjacent outer end of the rear section of the drainage trough to receive water therefrom for concealed drainage flow down the outside of the rear pillar.

The vehicle body drainage system construction of the invention provides effective sealing with drainage flow that is hidden from sight at both the front and rear ends of the associated roof opening in a manner not heretofore achieved by the prior art.

Each drainage system may include a front drip member having a base flange that is mounted on the associated front pillar and also having a projecting flange that cooperates with the base flange to define a drip channel within the front drainage passage. The front molding of each drainage passage preferably includes a base flange mounted on the associated front pillar and a cover flange that extends over the base flange thereof to cooperatively define the front drainage passage. The seal of each drainage system also preferably includes a front portion that extends downwardly along the associated front pillar from the outer end of the front section of the seal.

In preferred construction, each drainage system includes a tubular rear drainage member that defines the rear drainage passage and is covered by the rear molding. Also, the rear molding of each drainage system preferably includes forward and outboard flanges that cover the tubular rear drainage member. In addition, the seal of each drainage member also preferably includes a rear portion that extends downwardly along the associated rear pillar from the outer end of the rear section of the seal and is preferably mounted on the forward flange of the associated rear molding.

The objects, features, and advantages of the present invention are readily apparent from the following detailed description of the best mode for carrying out the invention when taken in connection with accompanying drawings.

BEST MODE FOR CARRYING OUT THE INVENTION

Figure 1:
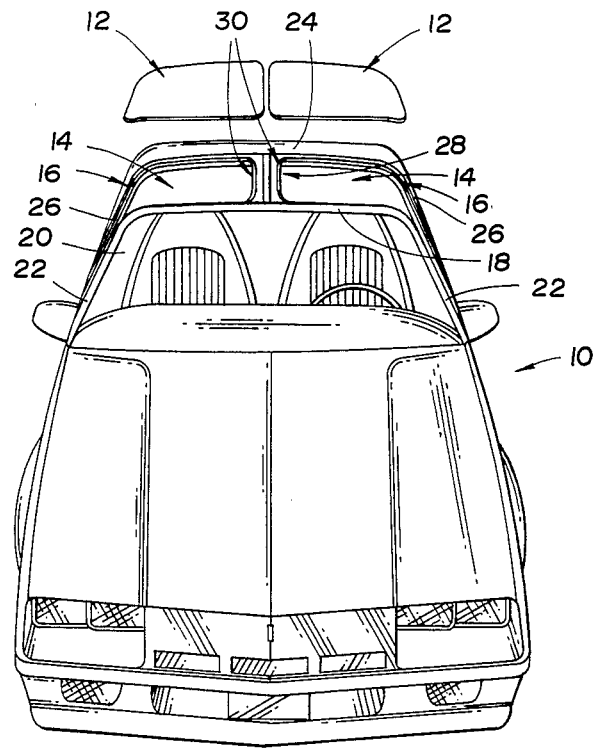
FIG. 1 is a front perspective view illustrating a vehicle whose body includes a pair of laterally oriented roof openings with an associated pair of drainage systems constructed in accordance with the present invention.

With reference to FIG. 1 of the drawings, the vehicle illustrated includes a vehicle body 10 having a pair of removable roof panels 12 for respectively closing a pair of roof openings 14. A pair of drainage systems 16 constructed in accordance with the present invention are respectively associated with the pair of roof openings 14 to provide sealing thereof as well as providing drainage flow of rain or other water from the roof as is hereinafter more fully described.

Figure 2:
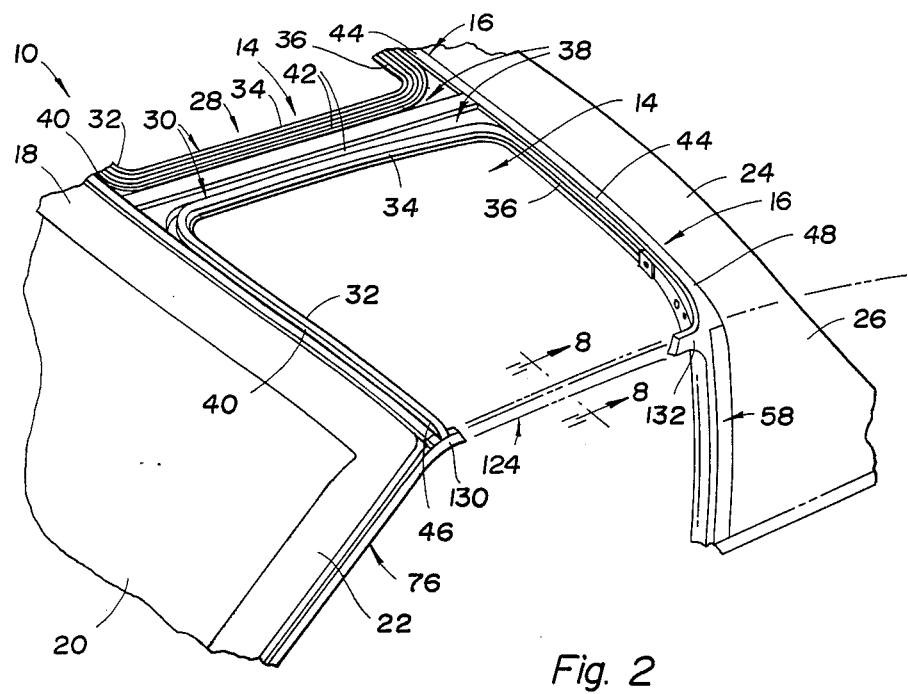
FIG. 2 is a partial perspective view of the vehicle body as seen from a front, outboard position so as to illustrate the construction of the drainage system.

As illustrated in FIGS. 1 and 2, the vehicle body 10 incorporating the drainage systems 16 is of the type including a front windshield header 18 that extends laterally with respect to the vehicle body at the top edge of the windshield 20. A pair of front pillars 22 respectively support opposite lateral ends of the windshield header 18 and are located at the opposite lateral edges of the windshield 20 just in front of the vehicle side door window openings. At the rear of the roof openings 14, the vehicle body includes a rear roof portion 24 spaced rearwardly from the windshield header 18 and extending laterally with respect to the vehicle body between its opposite sides. A pair of rear pillars 26 are illustrated in the form of sail-panels and respectively support opposite lateral sides of the rear roof portion 24 at the rear of the roof openings 14. A central strut 28 extends longitudinally between the windshield header 18 and the rear roof portion 24 to cooperate therewith in defining the front, inboard side, and rear of each roof opening 14.

As seen in FIG. 2, each drainage system includes a U-shaped seal 30 extending around the associated roof opening 14. Seal 30 has a front section 32 extending along the windshield header 18, an intermediate portion 34 extending along the central strut 28, and a rear section 36 extending along the rear roof portion 24. A U-shaped drainage trough 38 extends around the seal 30 and has front, intermediate, and rear sections 40, 42, and 44 respectively extending alongside the corresponding sections of the seal. The front section 40 of the drainage trough has an outer end 46 located adjacent the upper end of the associated front pillar 22. The rear section 44 of the drainage trough has an outer end 48 located adjacent the upper end of the associate rear pillar 26.

Figure 3:
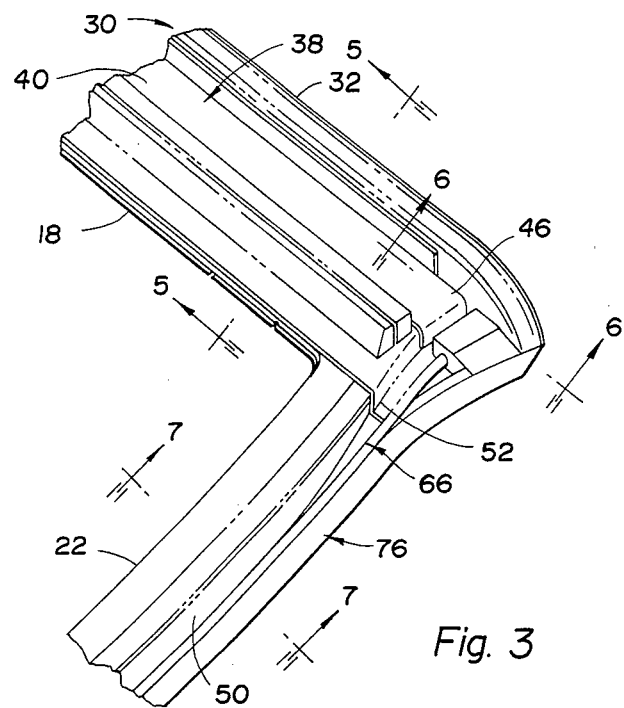
FIG. 3 is an enlarged portion of FIG. 2 taken at the junction between the windshield header and front pillar with portions thereof broken away to illustrate the drainage system construction.
Figure 7:
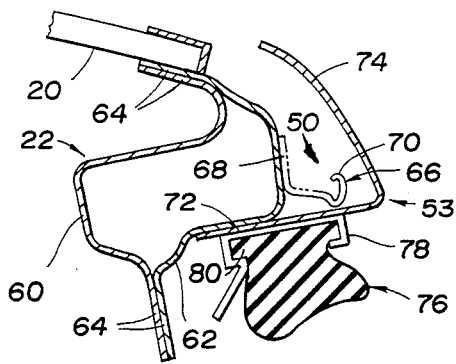
FIG. 7 is a sectional view taken through the front pillar along the direction of line 7—7 in FIG. 3.

With reference to FIG. 7, a front drainage passage 50 is provided extending along the exterior of the front pillar 22 with which the drainage system is associated. As shown in FIG. 3, the drainage passage 50 has an upper end 52 connected to the adjacent outer end 46 of the front section 40 of the drainage trough in order to receive water therefrom for concealed drainage flow down the outside of the front pillar. A rigid front molding 53 illustrated best in FIG. 7 is mounted on the outside of the associated front pillar 22 and defines the front drainage passage 50 as is hereinafter more fully described.

Figure 4:
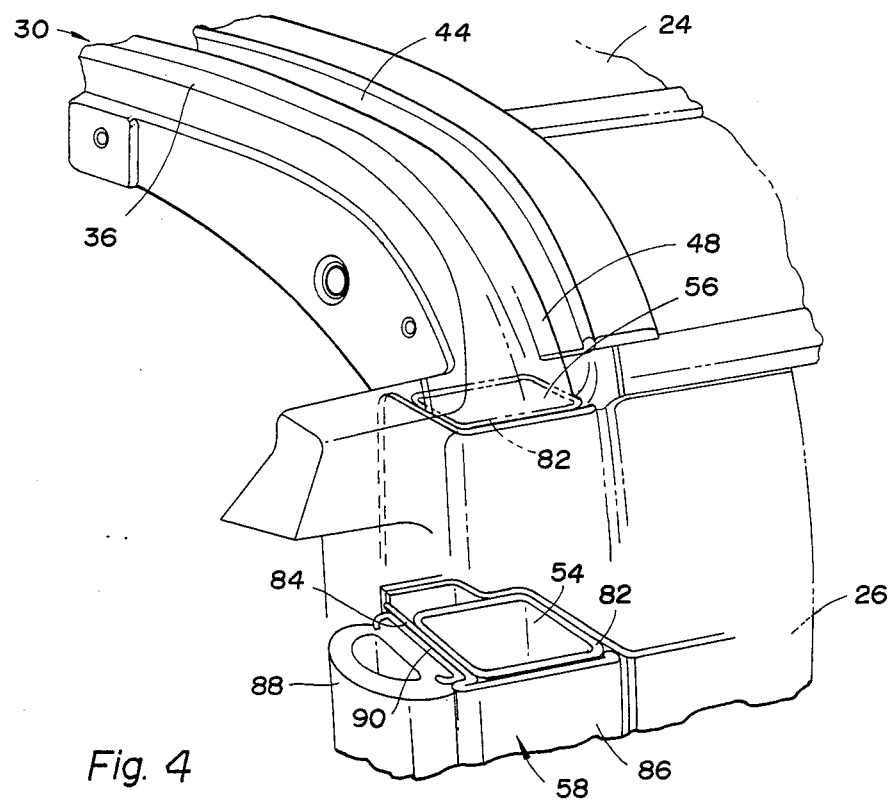
FIG. 4 is an enlarged perspective view of a portion of FIG. 2 at the junction between a rear roof portion and an adjacent rear pillar with portions thereof broken away to illustrate the drainage system construction.

With reference to FIG. 4, each drainage system 16 also includes a rear drainage passage 54 extending along the exterior of the associated rear pillar 26. An upper end 56 of the rear drainage passage 54 is connected to the adjacent outer end 48 of the rear section 44 of the drainage trough to receive water therefrom for drainage flow down the outside of the rear pillar. A rigid rear molding 58 is mounted along the outside of the associated rear pillar 26 with the rear drainage passage covered thereby as best illustrated in FIG. 4 such that the drainage flow is concealed.

As illustrated in FIG. 7, the front pillar 22 includes inner and outer members 60 and 62 having flanges 64 that are engaged and welded to each other. A front drip member 66 may be utilized, such as when the drainage system is to be retrofitted on a vehicle having such a drip member. Alternatively, the drip member may be removed. Drip member 66 has a base flange 68 mounted and secured on the outer member 62 of the front pillar 22 in any suitable manner such as by welding. A projecting flange 70 of the drip member 66 cooperates with the base flange 68 thereof to define a channel along which water can flow within the front drainage passage 50.

Front molding 53 as shown in FIG. 7 includes a base flange 72 that is mounted on the outer member 62 of the associated front pillar 22 in any suitable manner such as by welding. A cover flange 74 of front molding 53 extends over its base flange 72 to cooperate therewith in defining the front drainage passage 50 which is concealed from view.

As also illustrated in FIG. 7, the seal of each drainage system preferably includes a front portion 76 that extends downwardly along the associated front pillar 22 from the outer end of the front section of the seal. A retainer strip 78 secures a base 80 of front seal portion 76 and is mounted in any suitable manner on the base flange 72 of front molding 53.

With reference to FIG. 4, each drainage system 16 preferably includes a tubular rear drainage member 82 defining its rear drainage passage 54. As illustrated, the tubular construction of the rear drainage member 82 has a square cross section; but, it is to be understood that other shapes can also be used. Rear molding 58 extends along the rear drainage member 82 and has forward and outboard flanges 84 and 86 that cover the tubular rear drainage member so as to be hidden from sight.

As seen in FIG. 4, the seal of each drainage system 16 also includes a rear portion 88 that extends downwardly along the rear pillar 26 from the rear section 36 of the seal. This rear seal portion 88 is mounted on the forward flange 84 of rigid rear molding 58 by a retaining strip 90.

Figure 5:
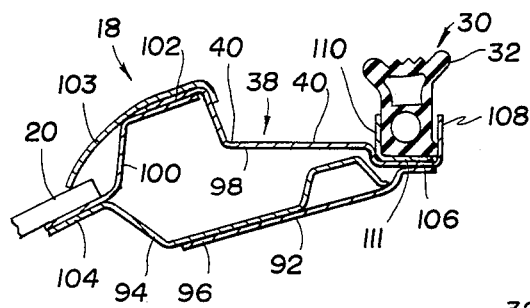
FIG. 5 is a sectional view taken through the windshield header along the direction of line 5—5 in FIG. 3.

As illustrated in FIG. 5, the windshield header 18 includes a pair of inner members 92 and 94 that are suitably secured to each other at 96 and also includes a pair of outer members 98 and 100 that are also suitably secured to each other at 102. The securement of these members is preferably by rivets, but welds could also be used. A suitable molding 103 extends between the windshield 20 and over the forward edge of the outer member 98 in order to hide the edge of the windshield 20 and the adjacent construction of the windshield header from sight. Windshield header 18 is of the conventional type having its inner and outer members 94 and 100 secured to each other at the forward edge 104 and having its inner and outer members 92 and 98 secured to each other adjacent the rear edge 106. A flange 108 of outer member 98 projects upwardly at the rear side of the front seal section 32, while a flange 110 of a retaining strip projects 111 upwardly at the forward side of the front seal section. Flanges 108 and 110 cooperate with each other to secure the front seal section 32 in position. Front drainage section 40 of the drainage trough is cooperatively defined by the windshield outer member 98 and the front seal section 32. It is important to note that the seal projects upwardly from the drainage trough such that any interruption between the seal and the associated roof panel does not result in any leakage as the water flow is at the bottom of the trough spaced below the point of engagement of the roof panel with the upper extremity of the seal.

Figure 6:
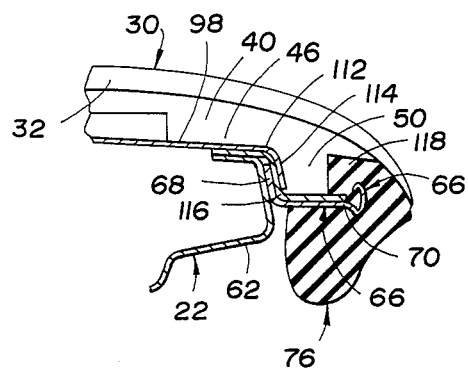
FIG. 6 is a sectional view taken at the junction of the windshield header with the upper end of the front pillar along the direction of line 6—6 in FIG. 3.

As best illustrated in FIG. 6, the windshield outer member 98 includes a lateral end 112 having a flange 114 located adjacent the upper end of the front pillar 22. A retaining strip 116 has a flange located between flange 114 and the outer member 62 and also has a base flange that supports the projecting flange 70 of the front drainage member 66 at its upper end. At this location, the front seal portion 76 includes an edge 118 that is located on the opposite side of the drip member 66 from the rest of the seal such that the projecting flange 70 is secured to the seal to provide support for its upper end.

Figure 8:
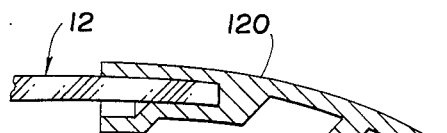
FIG. 8 is a sectional view through the removable roof panel associated with the roof opening with which the drainage system is utilized and is taken along the direction of line 8—8 in FIG. 2.

With reference to FIG. 8, each removable roof panel 12 has an outboard edge including an edge extrusion 120 having retainers 122 for mounting an outboard window seal 124 of a hollow construction including a pair of internal passages 125. Upon door closing, the upper edge 126 of a side door window 128 engages the seal 124 in order to provide a sealed relationship. Seal 124 as illustrated by phantom line representation in FIG. 2 extends between front and rear connection lugs 130 and 132 at which the front and rear seal sections 32 and 36 are respectively connected to the front and rear seal portions 76 and 88. These front and rear seal portions 76 and 88 engage front and rear edges of the side door window to provide sealing with the window closed.

While the best mode for carrying out the invention has been described in detail, those familiar with the art to which this invention relates will recognize various alternative designs and embodiments for practicing the invention as defined by the following claims.

What is claimed is:

1. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage systems respectively associated with the roof openings, each drainage system comprising: a U-shaped seal extending around the associated roof opening; the seal having front, intermediate, and rear sections that cooperatively define the U-shaped configuration thereof; a U-shaped drainage trough extending around the seal and having front, intermediate, and rear sections respectively extending alongside the corresponding sections of the seal; the front and rear sections of the drainage trough having outer ends respectively located adjacent the associated front and rear pillars; a rigid front molding mounted on the outside of the associated front pillar extending therealong and having a front drainage passage therein extending along the outside of the front pillar; the front molding having an upper end connected to the adjacent outer end of the front section of the drainage trough to receive water therefrom for concealed drainage flow down the outside of the front pillar; a rigid rear molding mounted on the outside of the associated rear pillar extending therealong and having a rear drainage member therein extending along the outside of the rear pillar; a rear seal portion mounted on the rear molding; and the rear drainage member having an upper end adapted to receive water from the adjacent outer end of the rear section of the drainage trough for concealed drainage flow down the outside of the rear pillar.

2. A vehicle body as in claim 1 wherein each drainage system also includes a front drip member having a base flange mounted on the associated front pillar and a projecting flange that cooperates with the base flange to define a drip channel within the front drainage passage.

3. A vehicle body as in claim 1 wherein the front molding of each drainage system includes a base flange mounted on the associated front pillar and a cover flange that extends over the base flange thereof to cooperatively define the front drainage passage.

4. A vehicle body as in claim 3 wherein the seal of each drainage system includes a front portion that extends downwardly along the associated front pillar from the outer end of the front section of the seal.

5. A vehicle body as in claim 1, 2, 3, or 4 wherein each drainage system includes a rear drainage member of a tubular construction defining its rear drainage passage.

6. A vehicle body as in claim 5 wherein the rear molding of each drainage system includes forward and outboard flanges that cover its tubular rear drainage member.

7. A vehicle body as in claim 6 wherein the rear seal portion extends downwardly along the associated rear pillar from the outer end of the rear section of the seal.

8. A vehicle body as in claim 7 wherein the rear seal portion of each drainage system is mounted on the forward flange of the associated rear molding.

9. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage systems respectively associated with the roof openings, each drainage system comprising: a U-shaped seal extending around the associated roof opening; the seal having front, intermediate, and rear sections that cooperatively define the U-shaped configuration thereof; the seal also having front and rear portions respectively extending downwardly along the associated front and rear pillars from the front and rear sections of the seal; a U-shaped drainage trough extending around the seal and having front, intermediate, and rear sections respectively extending alongside the corresponding sections of the seal; the front and rear sections of the drainage trough having outer ends respectively located adjacent the associated front and rear pillars; a rigid front molding mounted on the outside of the associated front pillar extending therealong and having a front drainage passage therein extending along the outside of the front pillar; the front molding having an upper end connected to the adjacent outer end of the front section of the drainage trough to receive water therefrom for concealed drainage flow down the outside of the front pillar; a rigid rear molding mounted on the outside of the associated rear pillar extending therealong and having a rear drainage member therein extending along the outside of the rear pillar; said rear seal portion being mounted on the rear molding; and the rear drainage member having an upper end adapted to receive water from the adjacent outer end of the rear section of the drainage trough for concealed drainage flow down the outside of the rear pillar.

10. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage systems respectively associated with the roof openings, each drainage system comprising: a U-shaped seal extending around the associated roof opening; the seal having front, intermediate, and rear sections that cooperatively define the U-shaped configuration thereof; the seal also having front and rear portions respectively extending downwardly along the associated front and rear pillars from the front and rear sections of the seal; a U-shaped drainage trough extending around the seal and having front, intermediate, and rear sections respectively extending alongside the corresponding sections of the seal; the front and rear sections of the drainage trough having outer ends respectively located adjacent the associated front and rear pillars; a rigid front molding having a base flange mounted on the outside of the front pillar and having a cover flange that extends over the base flange to cooperate therewith in defining a front drainage passage extending along the outside of the front pillar; the front molding having an upper end connected to the adjacent outer end of the front section of the drainage trough to receive water therefrom for concealed drainage flow through the front drainage passage down along the outside of the front pillar; a rear drainage member mounted on the outside of the associated rear pillar; the rear drainage member having a tubular construction defining a rear drainage passage extending along the outside of the associated rear pillar; the rear drainage member having an upper end adapted to receive water from the adjacent outer end of the rear section of the drainage trough for concealed drainage flow along the rear drainage passage down the outside of the rear pillar; a rigid rear molding mounted on the associated rear pillar over the rear drainage member to cover the rear drainage passage; and said rear seal portion being mounted on the rear molding.

* * * * *